B. BERKOVITZ.
AUTOMOBILE TOP HOLDING DEVICE.
APPLICATION FILED JUNE 2, 1916.

1,250,949.

Patented Dec. 25, 1917.

Inventor:
Benjamin Berkovitz

UNITED STATES PATENT OFFICE.

BENJAMIN BERKOVITZ, OF JOLIET, ILLINOIS.

AUTOMOBILE-TOP-HOLDING DEVICE.

1,250,949.                 Specification of Letters Patent.         Patented Dec. 25, 1917.

Application filed June 2, 1916.   Serial No. 101,251.

*To all whom it may concern:*

Be it known that I, BENJAMIN BERKOVITZ, a citizen of the United States, residing at Joliet, Illinois, have invented an Improvement in Automobile-Top Holders, of which the following is a specification.

My invention is an improvement in automobile top-holding devices, and the object of my invention is to furnish an easily operated device for locking within a holder the bows of an automobile top when the latter is folded and moved to the rear. I attain this object by the mechanism illustrated in the accompanying drawing, in which—

Figure 1:
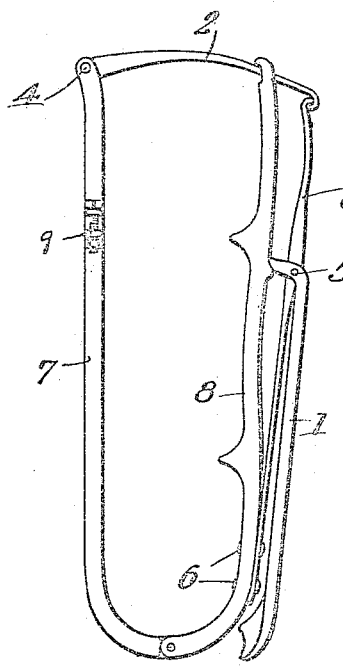
Figure 2:
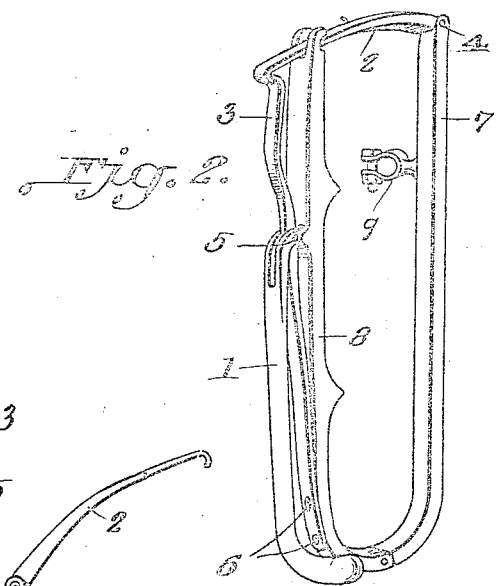
Figure 3:
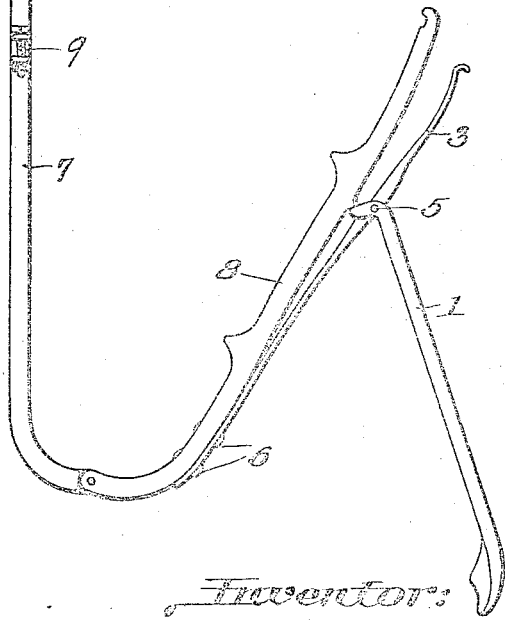

Figure 1 is a side view of the device in locked position. Fig. 2 is a perspective view of the device in locked position, and Fig. 3 is a side view of the device in unlocked position.

The hand-lever 1 is pivotally connected to the spring 3 by means of the pin 5. The clamp 2 is pivotally connected to the standard 7 by means of the pin 4. The standards 7 and 8 are hinged on each other. The pins 6 are to fasten spring 3 to standard 8. Clamp 2 is first engaged by the slotted end of standard 8 and its hooked end is then forced over the hooked end of spring 3, and by pressing the long arm of said lever inward, until its short arm face, in contact with standard 8, is past the center, the long arm of said lever is moved, automatically to the said standard, and thus locks the device by holding the hooked ends of clamp 2 and spring 3 in rigid engagement. The clamp 9, on standard 7, is to connect the device to the bed of the automobile, one on each side thereof, in positions to receive the folded bows of an auto top when the latter is collapsed and moved to the rear.

What I claim, is—

1. An automobile top-holder, comprising, a main standard adapted to be connected to the bed of the automobile, and a bow-pocket standard hinged on the former at the bottom; a clamp hinging on said main standard at its top and having a hook-shaped end; a spring fastened to the bottom part of said pocket-standard and having a hook-shaped end to engage the hook end of said clamp; a pivot-pin fastened to said spring about mid-way between its two ends; a hand-lever pivotally fulcrumed on said pivot-pin, the end of its short arm engaging the outer surface of said pocket-standard, whereby, the bows of the automobile top can be easily and securely locked in the pockets of the device.

2. In a device of the class described, a main standard adapted to be connected to a vehicle, a bow-pocket standard movably connected to said main standard, a clamping member hingedly secured to one of said standards, a resilient member secured to the other of said standards and having means for detachably engaging the free end of said clamping member, and a lever pivoted to said resilient member and having means engaging one of said standards to tension said resilient member to secure the said bow-pocket standard in closed position.

BENJAMIN BERKOVITZ.

Witnesses:
W. A. McROBERTS,
STEPHEN A. GOODSPEED.

Copies of this patent may be obtained for five cents each, by addressing the "Commissioner of Patents, Washington, D. C."